United States Patent
Rosu et al.

(10) Patent No.: US 7,117,501 B2
(45) Date of Patent: Oct. 3, 2006

(54) APPLICATION-LEVEL ACCESS TO KERNEL INPUT/OUTPUT STATE

(75) Inventors: Daniela Rosu, Ossining, NY (US); Marcel-Catalin Rosu, Ossining, NY (US)

(73) Assignee: International Business Machines Corporation, Armonk, NY (US)

(*) Notice: Subject to any disclaimer, the term of this patent is extended or adjusted under 35 U.S.C. 154(b) by 677 days.

(21) Appl. No.: 10/301,468

(22) Filed: Nov. 21, 2002

(65) Prior Publication Data
US 2004/0103221 A1  May 27, 2004

(51) Int. Cl.
*G06F 15/163* (2006.01)

(52) U.S. Cl. .................. 719/310; 719/312; 719/320; 718/108

(58) Field of Classification Search ............... 709/224; 718/108; 719/310, 312, 319, 320
See application file for complete search history.

(56) References Cited

U.S. PATENT DOCUMENTS

| | | | |
|---|---|---|---|
| 4,495,564 A | | 1/1985 | Draper et al. |
| 4,606,025 A | | 8/1986 | Peters et al. |
| 5,241,680 A | | 8/1993 | Cole et al. |
| 5,375,225 A | | 12/1994 | Dean et al. |
| 5,388,219 A | | 2/1995 | Chan et al. |
| 5,875,343 A | | 2/1999 | Binford et al. |
| 5,958,010 A | * | 9/1999 | Agarwal et al. ............ 709/224 |
| 6,055,617 A | * | 4/2000 | Kingsbury .................. 711/203 |
| 2003/0187977 A1 | * | 10/2003 | Cranor et al. ............... 709/224 |
| 2004/0064795 A1 | * | 4/2004 | Li et al. ....................... 716/5 |
| 2005/0198647 A1 | * | 9/2005 | Hipp et al. .................. 719/310 |
| 2005/0235114 A1 | * | 10/2005 | Megiddo et al. ............ 711/118 |

OTHER PUBLICATIONS

G. Banga and J. Mogul, "Scalable Kernel Performance for Internet Servers Under Realistic Loads," In *Proc. 1998 USENIX Annual Technical Conf.*, pp. 1-12, Jun. 1998.

G. Banga, J. Mongul and P. Druschel, "A Scalable and Explicit Event Delivery Mechanism for UNIX," In *Proc. 1999 USENIX Annual Technical Conf.*, pp. 253-265, Jun. 1999.

A. Chandra and D. Mosberger, "Scalability of Linux Event-Dispatch Mechanisms," In *Proc. 2001 USENIX Annual Technical Conf.*, 2001.

N. Provos, C. Lever and S. Tweedie, "Analyzing the Overload Behavior of a Simple Web Server," *Technical Report CITI-TR-00-7*, University of Michigan, Center for Information Technology, Aug. 2000.

(Continued)

*Primary Examiner*—William Thomson
*Assistant Examiner*—Andy Ho
(74) *Attorney, Agent, or Firm*—Douglas W. Cameron; Ryan, Mason & Lewis, LLP

(57) ABSTRACT

A technique for tracking a state of one or more input/output (I/O) channels associated with an application, by the application itself, comprises the steps of: (i) storing, by an operating system kernel, one or more selected elements of the state of at least a portion of the one or more I/O channels associated with the application in a memory which is shared by the application and the operating system kernel, when the one or more elements are available to the operating system kernel; (ii) acquiring, by the application, at least a portion of the stored elements through one or more memory read operations of the shared memory; and (iii) assessing, by the application, one or more of the acquired elements to determine the state of the one or more I/O channels corresponding thereto. In this manner, a need for context switching to track the state of the one or more I/O channels is thereby eliminated.

20 Claims, 7 Drawing Sheets

OTHER PUBLICATIONS

N. Provos and C. Lever, "Scalable Network I/O in Linux," *Technical Report CITI-TR-00-4, University of Michigan, Center for Information Technology*, May 2000.

T.E. Anderson, H.M. Levy, B.N. Bershad and E.D. Lazowska, "The Interaction of Architecture and Operating System Design," In *Proc. of the Fourth International Conference on Architectural Support for Programming Languages and Operating Systems*, pp. 108-120, Apr. 1991.

J. Ousterhout, "Why Aren't Operating Systems Getting Faster as Fast as Hardware?" In *Proc. of USENIX Summer Conference*, pp. 247-256, Jun. 1990.

R. Govindan and D.P. Anderson, "Scheduling and IPC Mechanisms for Continuous Media," *In Proc. of the 13th ACM Symposium on Operating System Principles*, pp. 68-80, Oct. 1991.

B.D. Marsh, M.L. Scott, T.J. LeBlanc, and E.P. Markatos, "First-Class User-Level Threads", *In Proc. of the 13th ACM Symposium on Operating System Principles*, pp. 110-121, Oct. 1991.

* cited by examiner

FIG. 7

```
701  int MaxPass;
702  int proxyFd;
703  uselect(int maxfds,
704         fdset readfds, fdset writefds, except exceptftds,
705         int timeout) {
706    static int numPass = 0;
707    int nbits;
708    nbits = BITS_IN_AND(readfds, A-bits, R-bits);
709    nbits += BITS_IN_AND(writefds, A-bits, W-bits);
710    nbits += BITS_IN_AND(exceptfds, A-bits, E-bits);
711    if(nbits > 0 && numPass < MaxPass) {
712       numPass++;
713       compute readfds, writefds, exceptfds based on R/W/E-bits;
       } else {
714       save/adjust maxfds, readfds, writefds, exceptfds
715       nbits = select(maxfds, readfds, writefds, exceptfds, timeout);
716       numPass = 0;
717       if(FD_ISSET(readfds, proxyFd)) {
718          adjust nbits, readfds, writefds, exceptfds based on R/W/E-bits
       }
    }
719    return nbits;
    }
```

FIG. 8

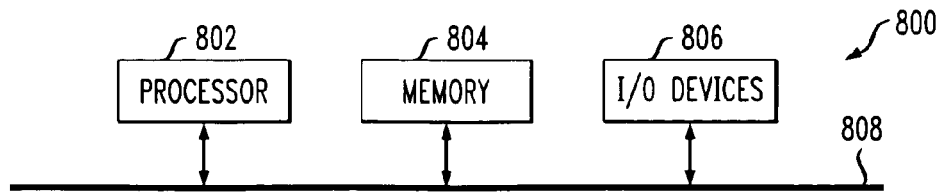

APPLICATION-LEVEL ACCESS TO KERNEL INPUT/OUTPUT STATE

FIELD OF THE INVENTION

The present invention relates generally to computer operating system architectures, and more particularly relates to techniques for enabling applications to acquire information regarding a state of their input/output (I/O) channels.

BACKGROUND OF THE INVENTION

Communication-intensive applications, such as, for example, applications running on Web servers and/or Web proxies, are typically required to handle a relatively large number of concurrent I/O channels. The number of I/O channels concurrently handled by a given application may range from a few hundred to tens of thousands. In the case of a Web proxy application, for example, I/O channels may include network connections to client nodes used for receiving requests, network connections to origin Web servers or other Web proxies used for retrieving content not available in its local storage, pipes to local helper applications used for performing auxiliary functions, connections to disk devices used for retrieving/storing content, etc.

Network connections represent a significant portion of the I/O channels managed by a particular network application. In a conventional network application, network connections, as well as other types of I/O channels, are often represented to the application as file descriptors. In a typical Unix kernel, the file descriptors representing network connections are generally associated with a socket data structure, while those representing other types of I/O channels, such as, for example, files or block I/O devices, are associated with file system-specific or device driver-specific data structures.

Conventional implementations of such communication-intensive applications may employ a large number of control threads. Since each control thread may require several tens of kilobytes (kB) of memory for storing its state, and switching control from one thread to another may require a large processor overhead, applications often attempt to limit the number of control threads used. However, when running with a small number of control threads, the application risks having these threads blocked waiting to perform a read or write operation when such operation cannot be satisfied. This type of blocking may results in an undesirable increase in response times. When all threads are blocked waiting to read or write content on some connections, other connections may be ready for read or write but cannot be handled immediately because no thread is available to handle the operation. In order to overcome this, an application may support nonblocking I/O (NBIO) operations. One known way to implement NBIO is to mark the file descriptors associated with network connections as nonblocking. This approach, however, is undesirable in that failed read or write operations (e.g., reads returning zero bytes, or writes sending no data) typically incur large overheads.

A primary component for implementations supporting efficient NBIO is a mechanism through which an application can learn about the state of its connections. For instance, I/O state elements of interest to the application may include the availability of data for reading and the availability of buffers for writing. Such mechanisms known by those skilled in the art are the select( ) and poll( ) system calls. These mechanisms are often referred to as I/O state tracking mechanisms. An I/O state tracking mechanism generally permits an application to first, declare an interest in one or more connections and corresponding set of I/O states, and second, receive notifications when a connection it has declared an interest in enters one of the states of interest.

Conventional I/O state tracking mechanisms generally have a large overhead associated therewith, primarily due to context switches used in their execution. Context switching, which essentially involves switching control from one protection domain (e.g., process, kernel, etc.) to another, incurs a relatively large overhead, at least in part because it requires saving and restoring a substantial amount of central processing unit (CPU) state to and from main memory (e.g., context switching between multiple protection domains in the CPU, each domain being defined by values stored in a set of privileged CPU registers). Moreover, triggering the exception handler that enacts the context switch requires a non-negligible overhead. In a communication-intensive application, the relatively high cost of conventional I/O state tracking undesirably impacts several aspects of the application's performance. Additionally, the overhead of the I/O state tracking mechanism can contribute to the total system CPU utilization. The larger the overhead, the lower the request rate that a Web proxy or origin Web server is able to service with reasonably low response times.

Conventional I/O state tracking mechanisms have explored various methodologies to reduce their processor overheads. Known operating system (OS) mechanisms for performing I/O state tracking, such as select( ) and poll( ) system calls, typically employ an application program interface (API) that combines declaration and notification, and allows an application to query about the state of virtually all of its active connections in a single system call.

To learn about the current states of its I/O connections, an application typically compiles a list of corresponding file descriptors and states of interest in a data structure and invokes a system call. In the kernel, for each of the sockets identified in the call parameters, a specialized socket handler is generally invoked to determine the current state of the connection. The result is registered in the data structure that will be returned to the application. These mechanisms retrieve the state of an application's sockets from the kernel by performing two or more context switches and two or more data copy operations. In the article G. Banga and J. Mogul, "Scalable Kernel Performance for Internet Servers Under Realistic Loads," In Proc. 1998 *USENIX Annual Technical Conf.*, pp. 1–12, June 1998, techniques are described for improving the scalability of select( )/poll( ) routines with the number of open sockets by lowering the overhead associated with collecting state information at the kernel level.

Event delivery interfaces have been suggested as alternatives to select( )/poll( ) techniques. Events are typically identified with connection state changes. For this type of mechanism, declaration is separated from notification. To use this type of interface, an application generally declares the sockets and state changes of interest through individual system calls. At the kernel level, the system builds a list of events indicating the state changes of interest for the application.

There are several known event delivery mechanisms that have been proposed. For example, the mechanism discussed in G. Banga, J. Mongul and P. Druschel, "A Scalable and Explicit Event Delivery Mechanism for UNIX," In *Proc. 1999 USENIX Annual Technical Conf.*, pages 253–265, June 1999, allow an application to retrieve multiple events concurrently and groups all of the events pending for a socket in a single notification. Similarly, the signal-per-file-descriptor mechanism proposed in A. Chandra and D. Mosberger, "Scalability of Linux Event-Dispatch Mechanisms," In *Proc.* 2001 *USENIX Annual Technical Conf.*, 2001, returns a single notification for each socket. Alternative event delivery mechanisms are described in N. Provos, C. Lever and S. Tweedie, "Analyzing the Overload Behavior of a Simple Web Server," *Technical Report CITI-TR-00-7, University of Michigan, Center for Information Technology*, August 2000. In comparison to the traditional select( )/poll( ) techniques, the event delivery mechanisms may reduce the amount of data copy, but are likely to incur a significantly large number of context switches (due to system calls), primarily because of the individual declarations of connections and states of interest.

The /dev/poll interface proposed in N. Provos and C. Lever, "Scalable Network I/O in Linux," *Technical Report CITI-TR-00-4, University of Michigan, Center for Information Technology*, May 2000, is similar to event delivery mechanisms with respect to the interest declaration, but it resembles the poll( ) system call with respect to the notification interface. This mechanism reduces the amount of data copy by using a shared memory region between application and kernel in which the kernel returns the results.

The above-mentioned interfaces and implementations known by those skilled in the art may achieve some reduction in the amount of context switching and data copying involved in I/O state tracking. However, these conventional mechanisms fail to completely eliminate context switches and/or data copying for each batch of notifications. Both context switching and data copying are operations that have been shown to scale poorly with processor speed (see, e.g., T. E. Anderson, H. M. Levy, B. N. Bershad and E. D. Lazowska, "The Interaction of Architecture and Operating System Design," In *Proc. of the Fourth International Conference on Architectural Support for Programming Languages and Operating Systems*, pages 108–120, April 1991, and J. Ousterhout, "Why Aren't Operating Systems Getting Faster as Fast as Hardware?" In *Proc. of USENIX Summer Conference*, pages 247–256, June 1990), and are thus undesirable.

There exists a need, therefore, for improved techniques that enable an application to track the state of its corresponding I/O connections, which address the above-mentioned problems exhibited in conventional network communication systems and applications.

SUMMARY OF THE INVENTION

The present invention is directed to techniques for enabling an application to access one or more elements of its I/O state, which may be maintained by an operating system kernel associated with the application, through simple read operations executed at the application level. In this manner, the invention enables the implementation of I/O-state tracking mechanisms that can provide notifications without incurring any context switching and/or data copying between application and kernel protection domains. This mechanism benefits applications such as, for example, Web proxies and Web servers which typically handle a relatively large number of concurrent I/O channels.

In accordance with one aspect of the invention, a method of tracking a state of one or more input/output (I/O) channels associated with an application, by the application itself, comprises the steps of: (i) storing, by an operating system kernel, one or more selected elements of the state of at least a portion of the one or more I/O channels associated with the application in a memory which is shared by the application and the operating system kernel, when the one or more elements are available to the operating system kernel; (ii) acquiring, by the application, at least a portion of the one or more stored elements through one or more read operations of the shared memory; and (iii) assessing, by the application, one or more of the acquired elements to determine the state of the one or more I/O channels corresponding thereto. In this manner, a need for context switching to track the state of the one or more I/O channels is thereby eliminated.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 7 illustrates exemplary pseudocode for implementing an I/O state tracking methodology, in accordance with one aspect of the invention.

FIG. 8 is a block diagram of an illustrative hardware implementation of a system providing application-level access to kernel I/O state, in accordance with one aspect of the invention.

DETAILED DESCRIPTION OF PREFERRED EMBODIMENTS

The present invention will be described herein in the context of a network communication system capable of running I/O-intensive applications, such as, for example, an Internet server application. It should be appreciated, however, that the invention is not limited to this or any particular network communication system. Rather, the invention is more generally applicable to a system configurable to provide application-level access to the I/O state associated with the application.

Figure 1:
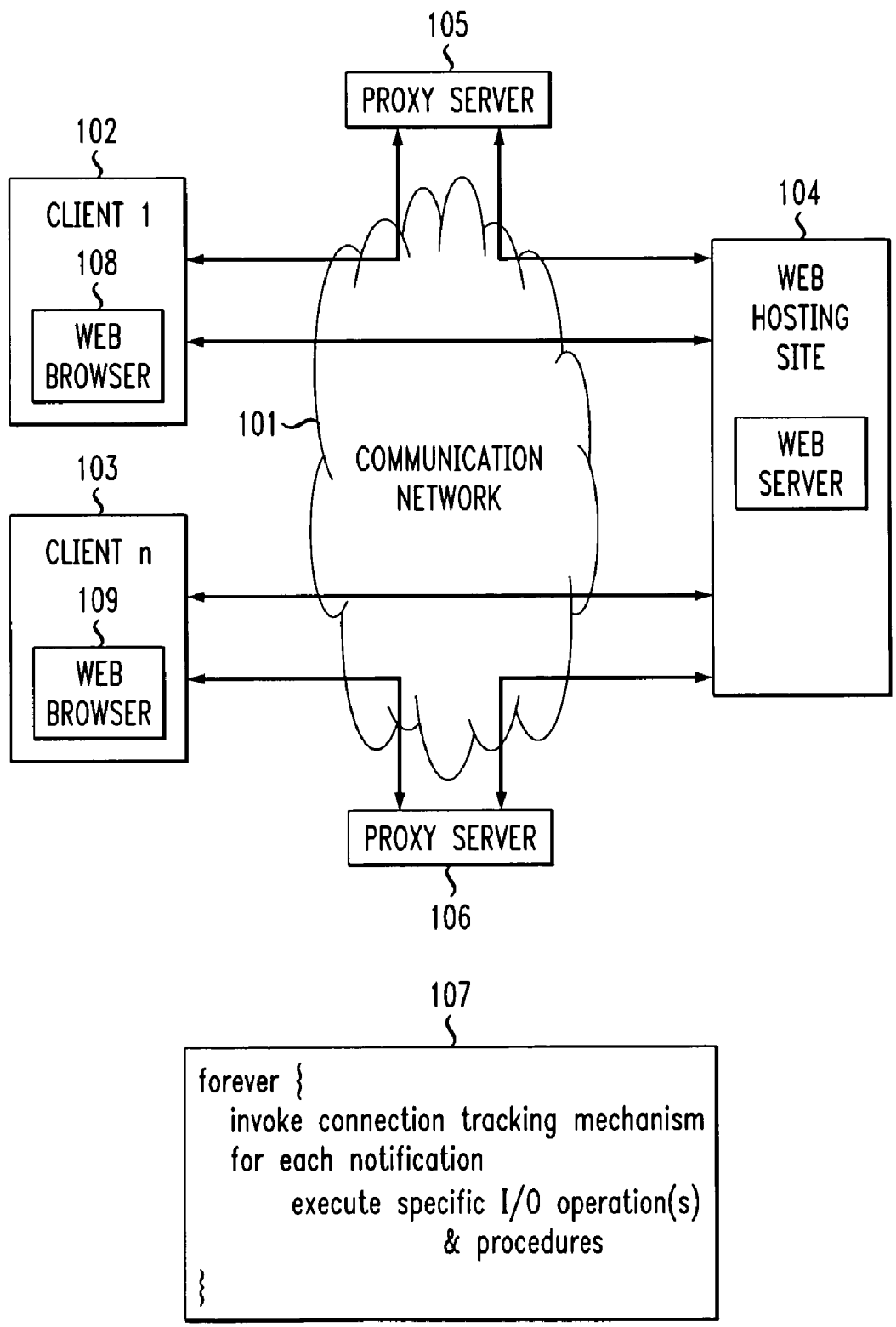
FIG. 1 is a block diagram illustrating an exemplary communication network in which the methodologies of the invention may be implemented.

FIG. 1 illustrates an exemplary communication network 101 in which the methodologies of the present invention may be implemented. The exemplary communication network 101 comprises at least one Web server node 104, a plurality of proxy server nodes 105 and 106, and a plurality of client nodes 102 and 103, designated "Client 1" and "Client n," respectively. Web server node 104 and proxy server nodes 105, 106 may service hypertext transfer protocol (HTTP) requests issued, for example, by Web browsers 108 and 109 which may be running on client nodes 102 and 103, respectively. Web server and proxy server applications are typical examples of I/O-intensive applications. These applications generally sustain a large number of concurrent network connections with clients and/or other servers, and perform a large volume of I/O operations (e.g., disk I/O).

As previously stated, I/O-intensive applications often employ an I/O state tracking mechanism to detect the readiness of I/O connections associated with the application for reading and/or writing, which the operating system typically presents to the application as file descriptors. Routine 107 shows at least a portion of an illustrative pseudocode for describing how an application uses I/O state tracking to handle its connections. The illustrative routine 107 may comprise a loop. At the beginning of each iteration of the loop, the application may invoke the I/O state tracking mechanism to collect notifications regarding which file descriptors (i.e., connections) are ready for processing. For each of these file descriptors, the application preferably performs I/O operations and invokes procedures specific to the type and state of the underlying connections. As previously stated, conventional I/O state tracking mechanisms typically perform two or more context switches during each iteration, and, in most cases, data copying between application and kernel domains.

Figure 2:
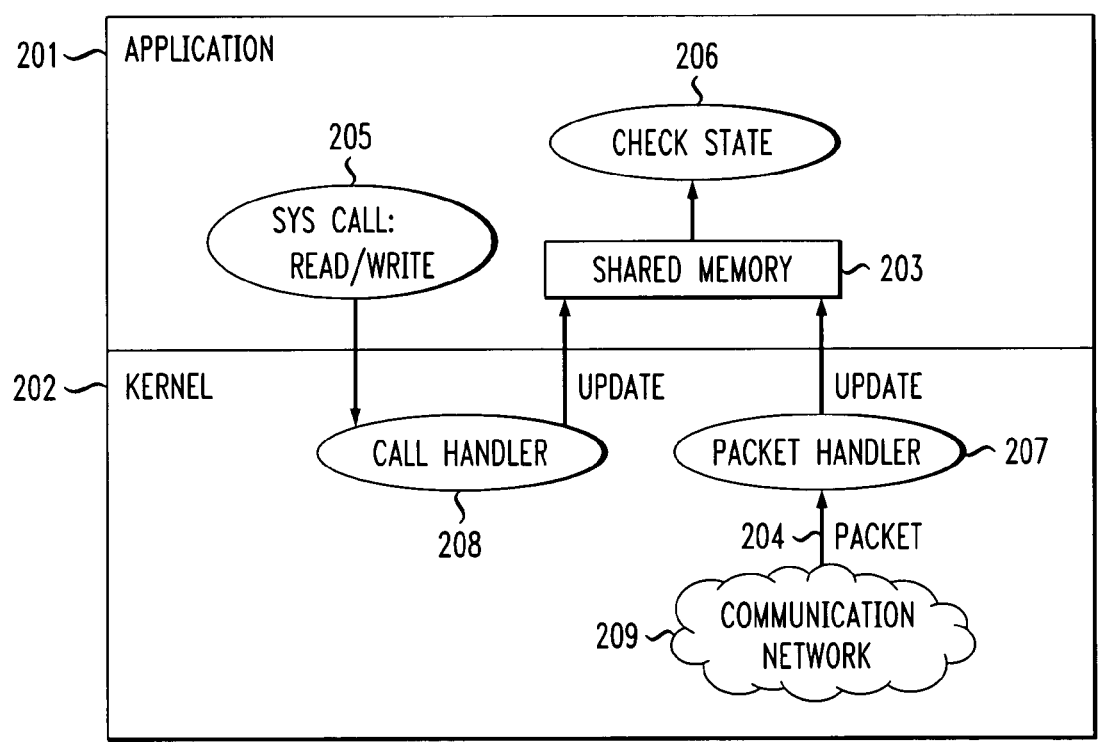
FIG. 2 is a block diagram illustrating an exemplary methodology by which the kernel updates the content of the shared memory region, in accordance with one aspect of the invention.

FIG. 2 illustrates an exemplary methodology which enables implementations of I/O state tracking that can advantageously provide notifications without the need for context switching and/or data copying between application and kernel domains, in accordance with one aspect of the invention. As apparent from the figure, an application 201, which may be running on a Web server (e.g., 104 in FIG. 1), and kernel code 202 associated with the operating system, preferably access a shared memory 203 for storing state elements (i.e., state descriptors) corresponding to the application's file descriptors. The operating system kernel 202 preferably updates a state descriptor when an event, such as, for example, a network packet arrival 204, or application-invoked operation, such as, for example, a system call 205 (e.g., read/write), occurs for the corresponding file descriptor socket. The state descriptor updates may be performed by kernel functions 207, 208 that process these events and operations, respectively.

When interested in checking the state of a file descriptor, the application 201 preferably checks, at block 206, the corresponding state descriptor in the shared memory 203. In order to collect notifications regarding the readiness of a particular I/O connection associated with the application 201, the application simply reads the state descriptor for the particular socket of interest. Advantageously, no context switch or data copy between application 201 and kernel 202 domains are involved.

By way of example only, each application 201 in the exemplary methodology comprises a separate memory 203 that it shares with the kernel 202, as previously stated. Preferably, only information pertaining to the file descriptors associated with application resides in shared memory 203. The shared memory 203 may comprise pinned-down memory pages, since the state variables can be updated by procedures executed in interrupt context when a processor on which the application is running cannot be interrupted to read memory pages swapped out of main memory coupled to the processor. Additional and/or alternative memory page types may also be employed in shared memory 203. The same type of state descriptor may be associated with all the file descriptors corresponding to the application.

Per-file descriptor state information, which may be maintained in the shared memory 203, is preferably specific to each embodiment of the invention. The set of state variables to be tracked, and the data structures relating thereto, may be determined by system and application requirements and capabilities. The state variables in the shared memory 203 may be copies of, or computed from, one or more components of the file descriptor state maintained in the kernel data structures.

The representation and layout of the shared memory 203 may be chosen as desired to enable optimal processing efficiency. In accordance with one aspect of the invention, at least a portion of the state variables are organized in the shared memory 203 as arrays indexed by a file descriptor number, or alternative indexing arrangement, and of size substantially equal to a maximum number of open file descriptors which the application can support. In an illustrative embodiment of the invention targeted at providing an application with an API, which may function in a manner similar to the select( )/poll( ) system calls, the state descriptor in the shared memory 203 comprises elements (e.g., computed values) that may describe, for example, a readiness for reading and/or writing a corresponding I/O connection, the existence of exception conditions for the corresponding file descriptor, etc.

Figure 3:
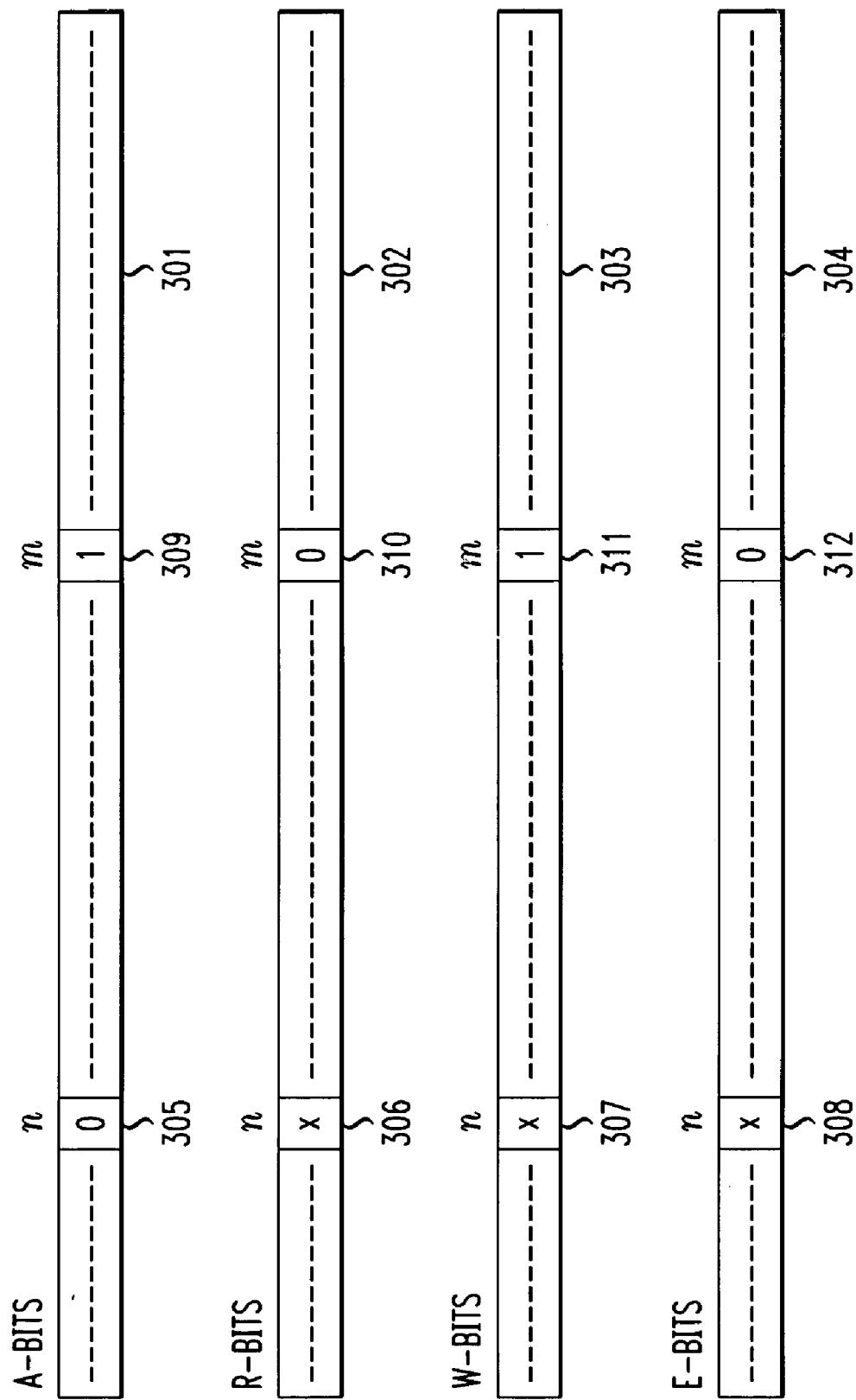
FIG. 3 illustrates an exemplary organization of the shared memory region shown in FIG. 2, according to the invention.

By way of example only, FIG. 3 illustrates how the state descriptor elements associated with shared memory 203 can be configurable as one or more bit arrays 301, 302, 303 and 304, with each array corresponding to a particular state of interest. Each of the arrays preferably comprises a plurality of bits, each bit corresponding to a file descriptor. For instance, array 302, referred to herein as R-bits, may comprise a plurality of bits representing a readiness for read, array 303, referred to herein as W-bits, may comprise a plurality of bits representing a readiness for write, and array 304, referred to herein as E-bits, may comprise a plurality of bits representing an existence of urgent data. Array 301, referred to herein as A-bits, may comprise a plurality of bits representing whether the state for the file descriptor is maintained by the kernel in the shared memory. Alternative memory organizations are similarly contemplated by the present invention.

The set of file descriptors for which the kernel maintains state descriptors in the shared memory, referred to herein as "active" file descriptors, may vary at any given time. For example, in accordance with one aspect of the invention, the kernel starts maintaining state descriptors corresponding to a given file descriptor after the application first defines (e.g., registers) its interest in the file descriptor, and stops maintaining state descriptors when the corresponding file descriptor is closed. In an alternative implementation of the invention, for file descriptors that correspond to transmission control protocol (TCP) sockets, the kernel starts maintaining state descriptors as soon as the socket is associated to the file descriptor. In an embodiment of the invention adaptable for use with a Linux operating system, the kernel may start maintaining state descriptors for a file descriptor that corresponds to a TCP socket after connection, or after the first select( )/poll( ) system call is executed on the socket. This approach is determined by the fact that in the Linux kernel, the file descriptor is not known in the handler that initializes the socket interface.

When a kernel starts maintaining state descriptors for a file descriptor, it preferably sets an implementation-specific flag, or alternative indicator, in the corresponding data structure available at the kernel level. For example, in a Linux kernel, for file descriptors that correspond to TCP sockets, the implementation-specific flag may be the value of a file index itself (e.g., a positive, non-zero value), and which may be set in a field of the socket data structure. The value of this field may be zero when the file descriptor corresponding to the TCP socket is not active. Alternative indicator values suitable for use with the present invention may also be employed, as will be understood by those skilled in the art.

The shared memory preferably comprises a list of the active file descriptors, for which the kernel currently maintains state descriptors in the shared memory. The definition of the shared memory state descriptor(s) associated with a given file descriptor may depend on whether or not the file descriptor is included in the list of active file descriptors. In accordance with one aspect of the invention, this list may be represented as A-bits array 301, with each bit in the array corresponding to a particular file descriptor that the application may open.

By way of example only, the following bit definitions may be employed, in accordance with the invention. When a bit in the A-bits array 301, which may be represented as bit m 309 (i.e., the m-th bit position in the A-bits array) is a logic one, the kernel is maintaining the state descriptors in the corresponding bit locations 310, 311 and 312 in bit arrays 302, 303 and 304, respectively. Therefore, the application can use the corresponding information to determine the state of its I/O connections. Likewise, when a bit in the A-bits array 301 of a file descriptor, which may be represented as bit n 305 (i.e., the n-th bit position in the A-bits array) is a logic zero, the kernel is not updating the state descriptors in the corresponding locations 306, 307 and 308 of bit arrays 302, 303 and 304, respectively. Consequently, the application should not use the corresponding information. It is to be appreciated that alternative bit definitions may be employed, in accordance with the invention.

When a file descriptor is considered to be no longer of interest to the application, it may be removed from the list of active file descriptors maintained in the shared memory area. The implementation-specific flag in the corresponding kernel level data structure may then be cleared (e.g., set to a logic zero).

As previously discussed, state variables in the shared memory are preferably updated by the kernel in functions that change the state of the file descriptor or of the underlying abstractions (e.g., TCP socket). Besides the original functionality, the corresponding kernel procedures can be modified to include the update of state descriptors in the shared memory of the corresponding application.

In accordance with an illustrative embodiment of the invention adaptable for use with the Linux operating system, for file descriptors that correspond to TCP sockets, the functions that update the descriptors in the shared memory are preferably part of the transport, network and socket layer processing. In Linux, each TCP socket is associated with a set of functions corresponding to its socket type and its underlying network and transport protocols, as will be understood by those skilled in the art. These functions are accessible through pointers from the socket data structure. Pointers to at least a portion of these functions may be replaced with implementation-specific functions which can call the original functions, identify state changes, filter the state changes and propagate them in the shared memory, etc.

Figure 4A:
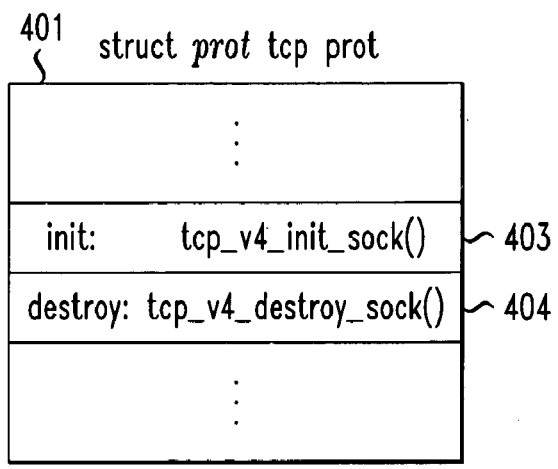
FIGS. 4A through 4C illustrate exemplary data structures for implementing at least a portion of the methodologies of the invention.
Figure 4B:
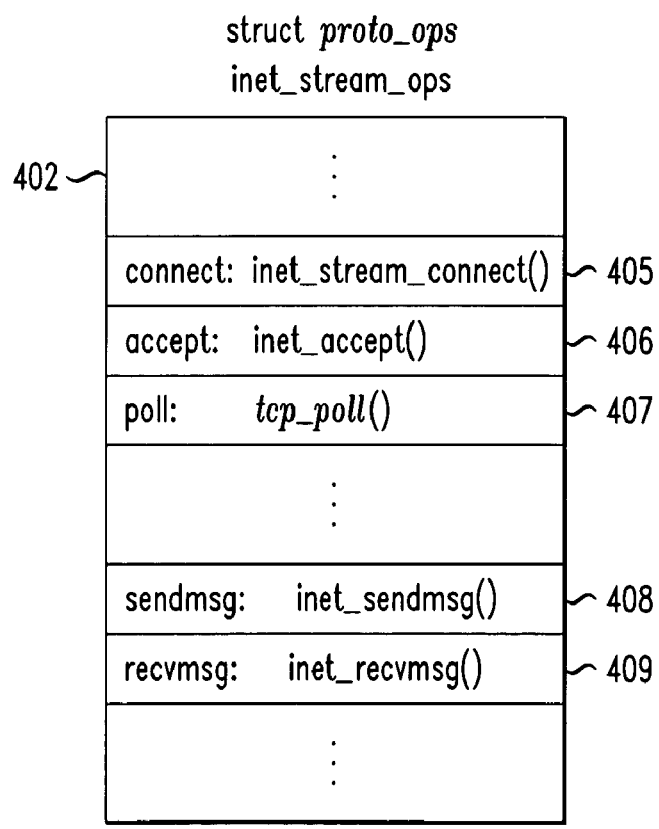
Figure 4C:
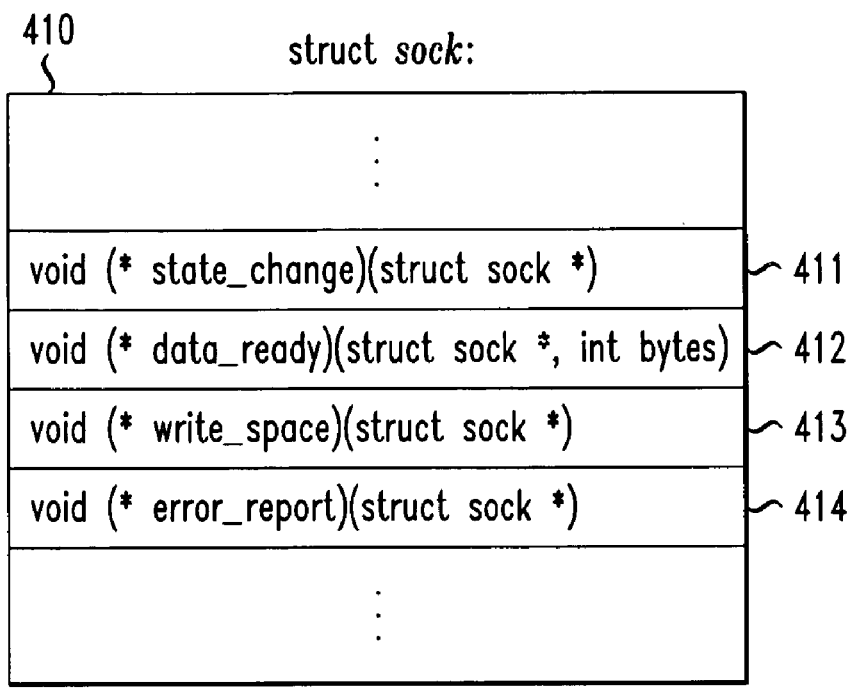

FIGS. 4A–4C illustrate exemplary data structures 401, 402 and 410 in which at least a portion of the methodologies of the present invention may be implemented. Data structures 401, 402, 410 may include functions replaced by the illustrative embodiment of the invention that supports the implementation of select( )/poll( ) API. These exemplary data structures 401, 402, 410 may be defined as structure prot, structure proto_ops and structure sock, respectively. Structure prot preferably comprises an interface of the transport layer, structure proto_ops comprises an interface of the network layer and may include functions called when the corresponding application issues system calls (e.g., read and write for TCP sockets), and structure sock comprises a socket descriptor and protocol control block, which may include functions called when packets are received on the TCP connection associated with the socket.

As shown in FIG. 4A, exemplary data structure 401 may include a function 403 invoked at socket creation. Data structure 401 may also include a function 404 invoked at socket destruction. The socket creation function 403 replaces the handlers originally associated with the socket with implementation-specific handlers. The socket destruction function 404 marks a corresponding file descriptor as inactive and replaces the implementation-specific handlers with the original handlers.

Referring to FIG. 4B, exemplary structure proto_ops 402 may include at least one of a connect function 405, an accept function 406, a select( )/poll( ) function 407, a read function 408, and a write function 409. The connection function 405 preferably marks a corresponding file descriptor as active and sets implementation-specific functions in the corresponding exemplary structure sock 410 shown in FIG. 4C. The accept function 406 preferably sets implementation-specific functions in the structure proto_ops of the new socket. Furthermore, when the accept socket is active, the implementation-specific function may update the parameter describing its readiness for read in the R-bits array 302 (see FIG. 3) in the shared memory. The tcp_poll( ) function 407 preferably marks the file descriptor as active and replaces the implementation-specific functions in exemplary data structure sock 410. Read function 408 preferably updates the parameter in the R-bits array 302 indicating a readiness for read, and the parameter in the E-bits array 304 indicating the existence of urgent data (see FIG. 3). Write function 409 preferably updates the parameter in the W-bits array 303 in the shared memory indicating a readiness for write (see FIG. 3).

With reference to FIG. 4C, exemplary data structure sock 410 may comprise a plurality of functions that may be specific to the application. For example, the sock data structure 410 may include functions for changing the state of a socket (e.g., TCP socket) 411, receiving a new packet 412, releasing a packet(s) from an output buffer storing the packet(s) 413, and receiving an error message 414. The implementation-specific functions for state change 411, packet receive 412, and error message receive 414 preferably indicate, in the shared memory, that the corresponding file descriptor is ready for read and, possibly, has urgent data. Likewise, the implementation-specific function for output buffer release 413 preferably indicates, in the shared memory, that the corresponding file descriptor is ready for write.

In an illustrative Linux embodiment, the implementation-specific functions may be part of a loadable kernel module. In an alternative embodiment of the invention, equivalent functionality may be achieved by changing the kernel code.

Figure 5:
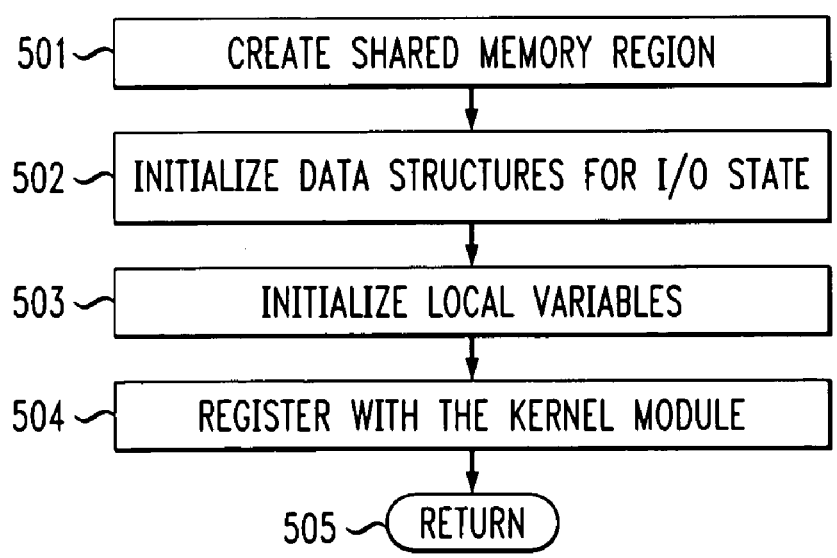
FIG. 5 is a logical flow diagram illustrating an exemplary methodology for initializing the shared memory region, in accordance with one aspect of the invention.

FIG. 5 illustrates an exemplary methodology for initializing the shared memory 203 (see FIG. 2), in accordance with one aspect of the invention. In step 501, the application creates the shared memory region, which may comprise issuing appropriate system calls. In step 502, the application initializes one or more data structures in the shared memory. In step 503, the application initializes one or more local variables that may be used, for example, in processing information in the shared memory. These local variables may be allocated in memory segments other than the shared memory. In step 504, the application registers itself with the kernel module. This step may comprise indicating an address of the shared memory and a maximum number of file descriptors associated with the application. In step 505, the application returns to its specific calling procedure.

In accordance with another aspect of the invention, the application has only read access to the state variables written by the kernel in the shared memory. Alternatively, the present invention contemplates that the application may have read and write access to these state variables, as will be understood by those skilled in the art. The application may access these state variables through direct memory operations, such as, for example, a memory read when there is read only access, or memory read and write when there is read and write access, respectively. The application may, alternatively, access the state variables through one or more library procedures. The library procedures may include, for example, procedures for initializing the shared memory region and/or procedures for retrieving per-file descriptor information from the shared memory region (e.g., in a format convenient for an application programmer). The library may further include additional procedures that exploit information from the shared memory region to implement various mechanisms, such as, but not limited to, I/O state tracking.

By way of example only, in an illustrative embodiment of the invention in which the shared memory includes information about the readiness for input and output of the application's file descriptors, as previously described in conjunction with FIG. 3, a library function can be used to implement I/O state tracking mechanisms similar to select( )/poll( ) system calls. When the shared memory includes transport layer state, the custom API can include functions similar to a getsockopt system call, which, given a file descriptor and an identifier of a socket state parameter, returns the current of value of the parameter for the corresponding TCP socket.

As previously stated, library functions can be implemented that provide substantially the same API as conventional I/O state tracking mechanisms, but which perform significantly fewer context switches and/or data copy between the application and the operating system kernel, in accordance with another aspect of the invention. For instance, the select( )/poll( ) APIs can be re-implemented with library functions that perform the following exemplary methodology (Note: in a Unix operating system, for example, I/O channels are identified to the application by file descriptors):

1. Traverse the parameters in which the application declares its I/O channels and states of interest. For each I/O channel for which the kernel is already providing state information in the shared memory (i.e., the I/O channel is registered), determine if a notification can be returned to the application.

2. When there are notifications and unregistered channels that have not been delayed more than a desired number of times, which may be specified by the application, return the available notifications to the application.

3. Otherwise, call the original select( )/poll( ) system call, removing, from the list of interest specified by the application, all of the channels already registered, and adding a control file descriptor used only by the system. Upon return, when indicated by the state of the control file descriptor, recheck the state of registered channels and add the corresponding notifications to the list returned by the system call. This exemplary methodology is described in further detail below, in conjunction with FIG. 6.

In a communication-intensive application, by using a library implementation of the select( )/poll( ) API, such as described above, only a small fraction of the calls will result in system calls, thus reducing the overhead of context switching and data copying between application and kernel domains. Furthermore, when a system call occurs, the number of channels specified in its parameters will be smaller than the parameters submitted by the application, thereby further reducing the amount of work performed by the operating system kernel and, preferably, the amount of data copy, compared to the original implementation of the select( )/poll( ) API.

Figure 6:
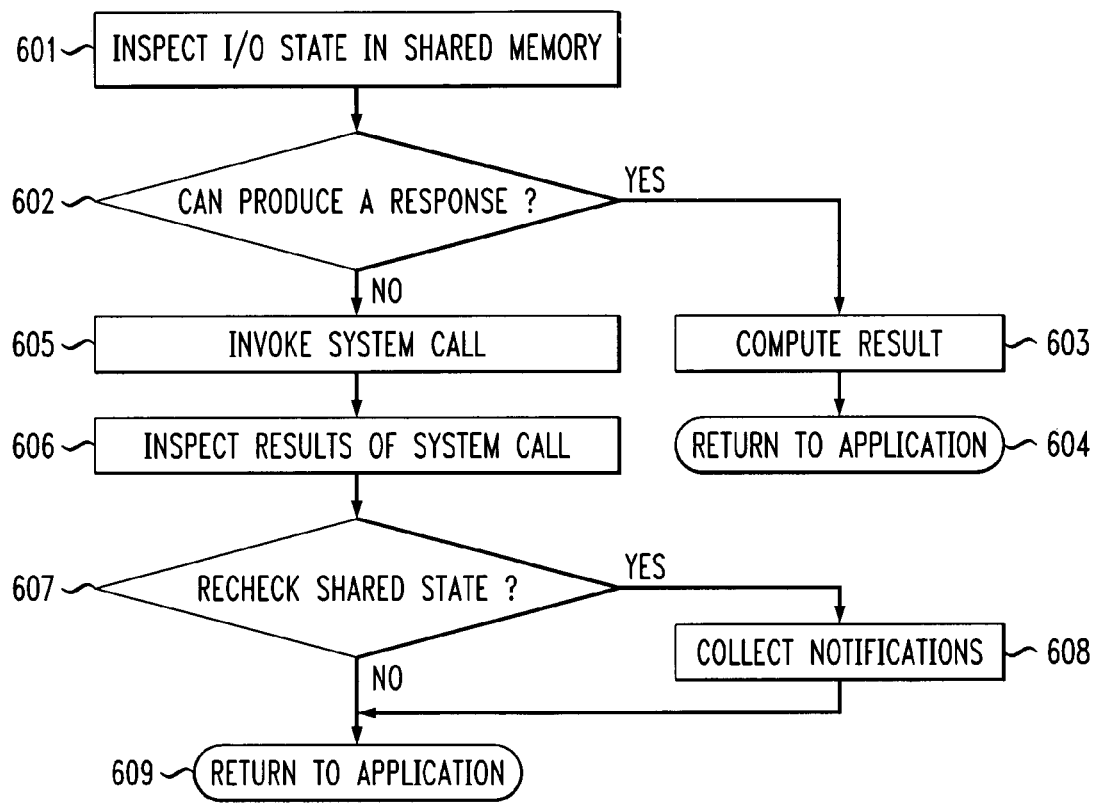
FIG. 6 is a logical flow diagram illustrating an exemplary methodology for accessing the I/O state in the shared memory region, in accordance with one aspect of the invention.

With reference now to FIG. 6, an exemplary methodology for implementing an I/O state tracking mechanism is shown, in accordance with one aspect of the invention. The exemplary methodology, which may be a library procedure, preferably exploits state information in the shared memory. This methodology may be associated with the exemplary function uselect. The exemplary function uselect may comprise an interface name (e.g., uselect( ) and one or more parameters, including, for example, a plurality of bitmaps (e.g., read, write and exception), a timeout, and an integer indicating a position of the last logic one in either of the bitmaps.

As shown in FIG. 6, in step 601 of exemplary function uselect, state descriptors in the shared memory are inspected. In step 602, the function determines whether a response (i.e., notification) can be produced. When a response can be produced and there are no implementation-specific restrictions for an immediate return, the resultant data structures are computed in step 603. The results are then returned to the calling application in step 604. When a response cannot be produced, a system call to a native I/O state tracking mechanism, such as, for example, select( ), is invoked in step 605. Upon return to function uselect, the results of the system call are inspected in step 606. In step 607, the function determines whether it is necessary to recheck the state descriptors in the shared memory. When rechecking is necessary, notifications are collected in step 608 and returned, together with the results of the system call, to the application in step 609. When rechecking is not necessary, the function simply returns the system call results to the application in step 609, without collecting notifications.

In accordance with an exemplary methodology of the present invention, the shared memory region is organized into a plurality of arrays, as previously described in connection with FIG. 3. A library utilized by the exemplary methodology may include an initialization procedure, which preferably executes the exemplary initialization routine previously described in connection with FIG. 5. Local variables initialized by this procedure may include a TCP socket, designated proxyFd, which can be used as a proxy for all active sockets (e.g., with entry set in A-bits array 301) for execution of the select( ) system call. This socket is provided as a parameter when the application registers with the kernel module implementing this exemplary methodology. The implementation-specific functions in the data structure sock 410 preferably mark the file descriptor of the proxy socket as ready for read, and unblock any threads waiting for this event when one of the active file descriptors of the application is marked as ready to read/write or has an exception condition.

Other local variables used by this exemplary methodology may include a variable numPass, which is a counter for tracking the number of invocations of the uselect function since the last invocation of the select( ) system call. Another variable MaxPass may be defined by the exemplary methodology, which is an implementation-specific upper bound for the counter numPass.

FIG. 7 illustrates an exemplary methodology 700, performed in accordance with one aspect of the invention. As apparent from the figure, the exemplary methodology 700 initializes the variables MaxPass, proxyFd and numPass at steps 701, 702 and 706, respectively. As previously stated, proxyFd is used as a TCP socket, numPass is used as a counter, and MaxPass is used as an upper bound for counter numPass.

In steps 703 through 705, uselect function parameters are defined. Specifically, read, write and exception file descriptors readfds, writefds and exceptfds, respectively, are preferably defined. Additionally, variables maxfds and timeout may be defined for specifying a maximum number of file descriptors and a timeout period, respectively.

Steps 707 through 710 of the exemplary methodology 700 provide some detail as to how the uselect function examines the state descriptors in the shared memory region searching for notifications of interest to the application. Specifically, the uselect function preferably searches for relevant file descriptor states by performing a bitwise AND between the file descriptors (i.e., bitmaps), provided as parameters, and shared memory bitmaps. For example, in step 708, the readfds file descriptor is checked against corresponding bit positions in the A-bits and R-bits arrays (see FIG. 3). Similarly, in step 709, the writefds file descriptor is checked against corresponding bit designations in the A-bits and W-bits arrays. In step 710, the exceptfds file descriptor is checked against corresponding bit positions in the A-bits and E-bits arrays.

In step 711, the uselect function determines whether the result, stored in variable nbits, of any of the bitwise ANDs is greater than zero, and whether the counter numPass is less than the upper bound MasPass. When the result of any of the bitwise ANDs is non zero, the uselect function increments counter numPass in step 712, modifies the parameter bitmaps appropriately in step 713, and returns the total number of bits set in the three arrays in step 719. Otherwise, the uselect function invokes the select( ) system call in step 715 and sets counter numPass to zero in step 716. The invocation of select( ) in step 715 may also occur when counter numPass has reached the upper bound MaxPass, as a way to prevent the starvation of file descriptors not yet active (i.e., for which the kernel is not updating the related state descriptors in the shared memory region).

Before calling the select( ) routine in step 715, the A-bits array in the shared memory region is preferably masked off in the parameter read and write file descriptors readfds and writefds, respectively, while preserving a copy of the original file descriptors in step 714. Also, the bit for the TCP socket proxyFd is set in the read file descriptor readfds in step 717. This means that the select( ) routine is not asked for notifications on the active file descriptors, but is asked for notification on the socket proxyFd. This approach may reduce the size of the system call parameters. The maxfds parameter is adjusted accordingly and the timeout parameter is unchanged. Upon return, if the bit for the proxyFd is set (item 617), which indicates the occurrence of state changes on any of the active file descriptors, a second search is performed on the R-bit, W-bit and E-bit arrays (item 618). Using a saved copy of the parameter bitmaps, bits are set in the parameter bitmaps for the active file descriptors for which the new states match the application's interests.

An unoptimized version of the exemplary uselect function has been described herein, primarily due to its simplicity. It is to be appreciated, however, that the uselect implementation may include optimizations not shown in FIG. 7. Specifically, one or more steps of the uselect methodology may be combined and/or eliminated, according to the invention. For example, counting the logic one bits (i.e., bitwise AND) in the bit arrays, adjusting the parameter bitmaps, and saving bits that are reset during the adjustment step may all be performed in the same pass. Saving bits may only be necessary for the code path using the select( ) system call, and it is stopped as soon as deemed unnecessary. This and other optimizations change the implementation substantially.

The techniques of the present invention can be used for the optimization and/or implementation of other types of system services besides I/O state tracking. The selection of the state elements stored in the shared memory are preferably selectively customizable for the type of function(s) to be optimized and/or enabled. For instance, to provide the application with low cost access to transport-layer socket parameters that vary at runtime (e.g., round-trip time), related information can be stored in the shared memory. Furthermore, in accordance with another aspect of the invention, the shared memory can be used by the application to communicate, to the operating system kernel, specific attributes of the I/O interactions associated with the application. The kernel can then use this information when performing operations, such as, for example, I/O operations, on behalf of the application and/or when computing state elements for storage in the shared memory.

Referring now to FIG. 8, a block diagram of an illustrative system 800 providing application-level access to kernel I/O state according to the invention is shown. In this illustrative implementation, a processor 802 for implementing at least a portion of the methodologies of the invention is operatively coupled to a memory 804 and I/O devices 806 via a bus 808, or an alternative connection arrangement. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc. Furthermore, the term "I/O devices" as used herein is intended to include, for example, one or more input devices (e.g., keyboard, mouse, etc.) for entering data to the processor, and/or one or more output devices (e.g., keyboard, monitor, etc.) for presenting the results associated with the processor.

It is to be appreciated that while the present invention has been described herein in the context of a network communication system, the methodologies of the present invention may be capable of being distributed in the form of computer readable media, and that the present invention applies equally regardless of the particular type of signal-bearing media actually used to carry out the distribution. The term "computer readable media" as used herein is intended to include recordable-type media, such as, for example, a floppy disk, a hard disk drive, RAM, compact disk (CD) ROM, etc., and transmission-type media, such as digital and analog communication links, wired or wireless communication links using transmission forms, such as, for example, radio frequency and optical transmissions, etc. The computer readable media may take the form of coded formats that are decoded for use in a particular data processing system.

Accordingly, an application program, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 802. In any case, it is to be appreciated that at least some of the components of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the teachings of the invention provided herein, one of ordinary skill in the art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method for tracking a state of one or more input/output (I/O) channels associated with an application by the application itself, the method comprising the steps of:

storing, by an operating system kernel, one or more selected elements of the state of at least a portion of the one or more I/O channels associated with the application in a memory which is shared exclusively by the application and the operating system kernel, when the one or more elements are available to the operating system kernel;

acquiring, by the application, at least a portion of the stored elements through one or more read operations of the shared memory without the need for performing at least one of context switching and data copying between the application and the operating system kernel; and assessing, by the application, one or more of the acquired elements to determine the state of the one or more I/O channels corresponding thereto;

wherein the application does not perform network traffic monitoring operations.

2. The method of claim 1, wherein the shared memory comprises pinned-down memory and is configurable for at least one of reading and writing from substantially any component of the operating system kernel.

3. The method of claim 1, wherein at least one of the step of acquiring the stored elements and the step of assessing the acquired elements comprises invoking one or more library functions associated with at least one of the application and the operating system kernel.

4. The method of claim 3, wherein the one or more library functions are configurable to implement an application program interface (API) substantially identical to an existing kernel API for assessing a state of one or more I/O channels available to the operating system kernel.

5. The method of claim 1, further comprising the step of invoking, by the application, one or more library functions configurable for accessing at least a portion of the one or more elements available in the shared memory to implement an existing kernel application program interface (API) for determining a state of one or more I/O channels available to the operating system kernel.

6. The method of claim 5, wherein an implementation of the existing kernel API comprises invoking the kernel API when indicated by the one or more elements available in the shared memory.

7. The method of claim 1, wherein the one or more elements stored in the shared memory comprise information that is accessible only to the operating system kernel using information stored by the application in the shared memory.

8. The method of claim 7, wherein the application uses one or more library functions for storing the information to be accessed by the operating system kernel.

9. The method of claim 8, wherein the one or more library functions are configurable for implementing an API substantially identical to an existing kernel application program interface for specifying, by the application, information to be used in determining a state of one or more I/O channels available to the operating system kernel.

10. An apparatus for tracking a state of one or more input/output (I/O) channels associated with an application by the application itself, the apparatus comprising:

memory, at least a portion of the memory being shared exclusively by the application and an operating system kernel; and at least one processor coupled to the memory, the at least one processor being operative to: (i) store, by the operating system kernel, one or more selected elements of the state of at least a portion of the one or more I/O channels associated with the application in the shared memory when the one or more elements are available to the operating system kernel; (ii) acquire, by the application, at least a portion of the stored elements through one or more read operations of the shared memory without the need for performing at least one of context switching and data copying between the application and the operating system kernel; and (iii) assess, by the application, one or more of the acquired elements to determine the state of the one or more I/O channels corresponding thereto;

wherein the application does not perform network traffic monitoring operations.

11. The apparatus of claim 10, wherein the at least one processor is further operative to: (iv) invoke, by the application, one or more library functions configurable for accessing at least a portion of the one or more elements available in the shared memory to implement an existing kernel application program interface (API) for determining a state of one or more 110 channels available to the operating system kernel.

12. The apparatus of claim 10, wherein the one or more elements stored in the shared memory comprise information available in a portion of the memory that is accessible only to the operating system kernel using information stored by the application in the shared memory.

13. The apparatus of claim 12, wherein the application uses one or more library functions for storing the information to be accessed by the operating system kernel.

14. The apparatus of claim 13, wherein the one or more library functions are configurable for implementing an API substantially identical to an existing kernel API for specifying, by the application, information to be used in determining the state of the one or more I/O channels available to the operating system kernel.

15. An article of manufacture for tracking a state of one or more input/output (I/O) channels associated with an application by the application itself, comprising a machine readable medium including one or more programs which when executed implement the steps of:
- storing, by an operating system kernel, one or more selected elements of the state of at least a portion of the one or more I/O channels associated with the application in a memory which is shared exclusively by the application and the operating system kernel, when the one or more elements are available to the operating system kernel;
- acquiring, by the application, at least a portion of the stored elements through one or more read operations of the shared memory without the need for performing at least one of context switching and data copying between the application and the operating system kernel; and
- assessing, by the application, one or more of the acquired elements to determine the state of the one or more I/O channels corresponding thereto;
- wherein the application does not perform network traffic monitoring operations.

16. The article of claim 15, wherein at least one of the step of acquiring the stored elements and the step of assessing the acquired elements comprises invoking one or more library functions associated with at least one of the application and the operating system kernel.

17. The article of claim 16, wherein the one or more library functions are configurable to implement an application program interface (API) substantially identical to an existing kernel API for assessing a state of one or more I/O channels available to the operating system kernel.

18. The article of claim 15, wherein the one or more programs further implements the step of invoking, by the application, one or more library functions configurable for accessing at least a portion of the one or more elements available in the shared memory to implement an existing kernel application program interface (API) for determining a state of one or more I/O channels available to the operating system kernel.

19. The article of claim 18, wherein an implementation of the existing kernel API comprises invoking the kernel API when indicated by the one or more elements available in the shared memory.

20. The article of claim 15, wherein the one or more elements stored in the shared memory comprise information available in memory that is accessible only to the operating system kernel using information stored by the application in the shared memory.

* * * * *

UNITED STATES PATENT AND TRADEMARK OFFICE
CERTIFICATE OF CORRECTION

| | | |
|---|---|---|
| PATENT NO. | : 7,117,501 B2 | Page 1 of 1 |
| APPLICATION NO. | : 10/301468 | |
| DATED | : October 3, 2006 | |
| INVENTOR(S) | : Rosu et al. | |

It is certified that error appears in the above-identified patent and that said Letters Patent is hereby corrected as shown below:

In the claims:

Claim 11, col. 14, line 52, delete "110" and insert --I/O--.

Signed and Sealed this

Second Day of January, 2007

JON W. DUDAS
*Director of the United States Patent and Trademark Office*